Sept. 18, 1928.  
E. A. FORD  
1,684,389  
CARD FEEDING AND HANDLING DEVICE  
Filed June 1, 1925　　8 Sheets-Sheet 3

Inventor  
E A Ford  
By his Attorneys  
Cooper Kerr + Dunham

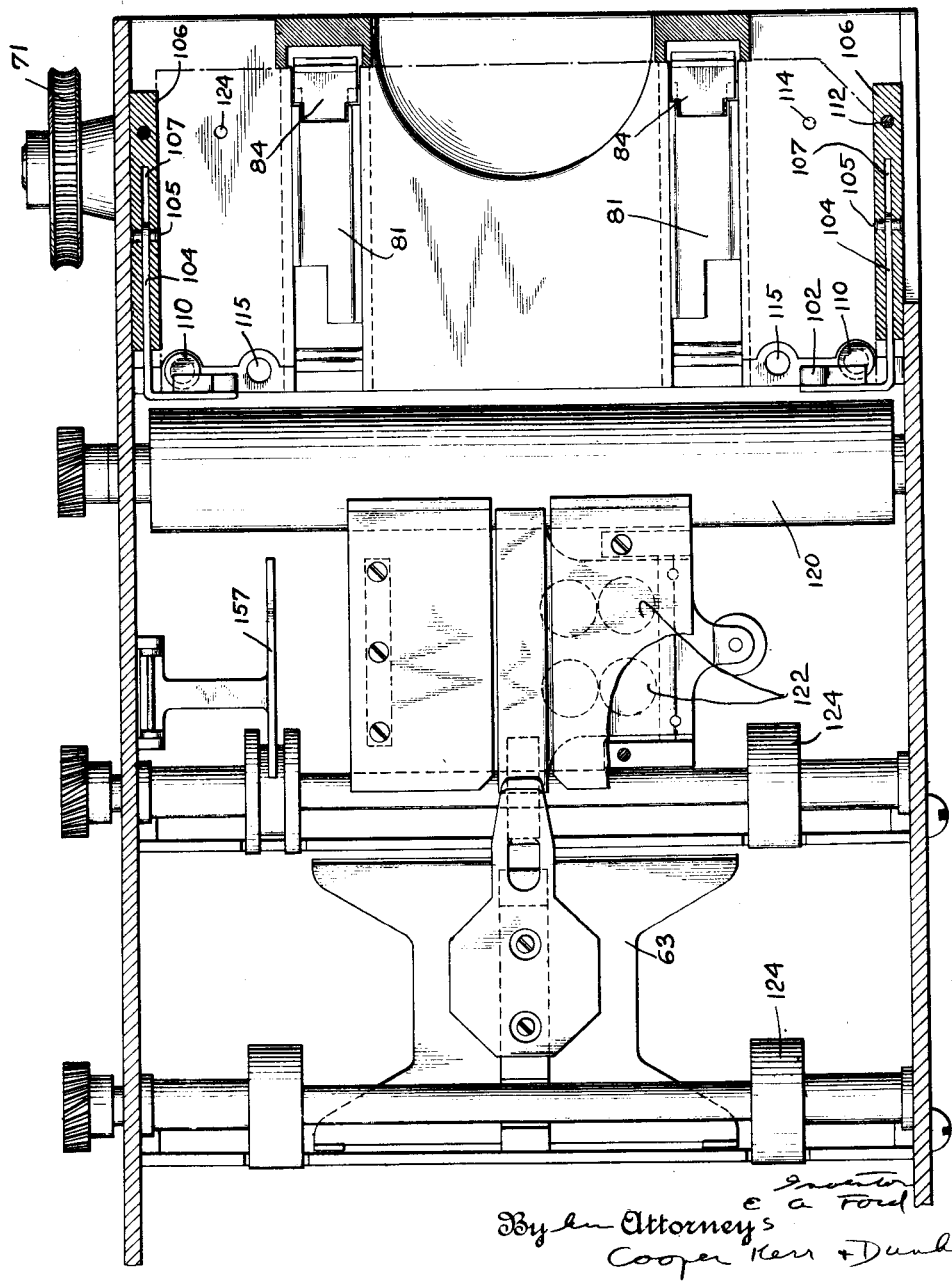

Sept. 18, 1928.	1,684,389
E. A. FORD
CARD FEEDING AND HANDLING DEVICE
Filed June 1, 1925	8 Sheets-Sheet 5
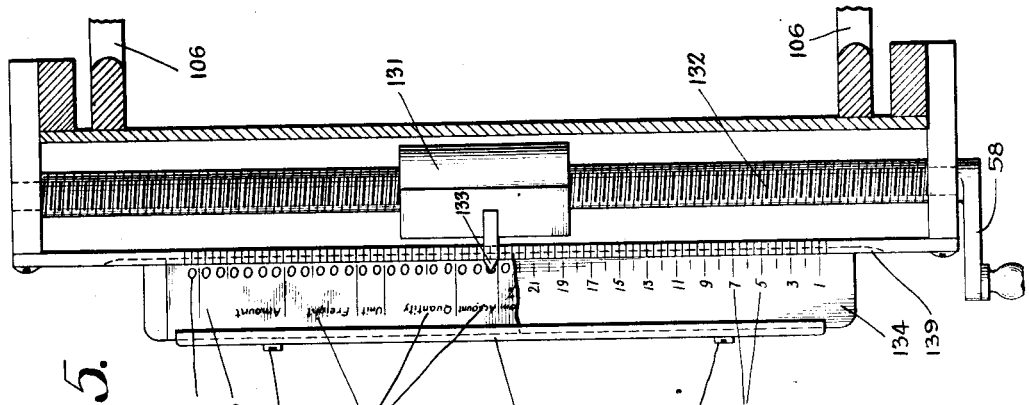
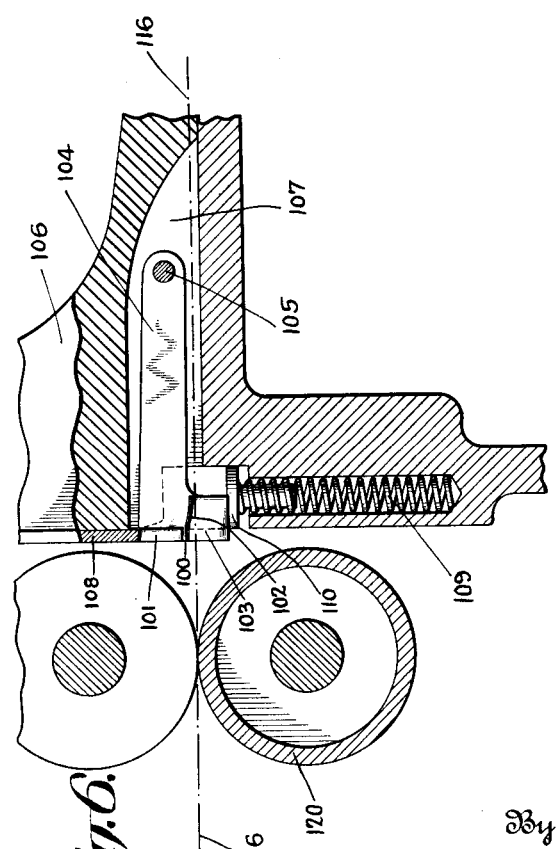
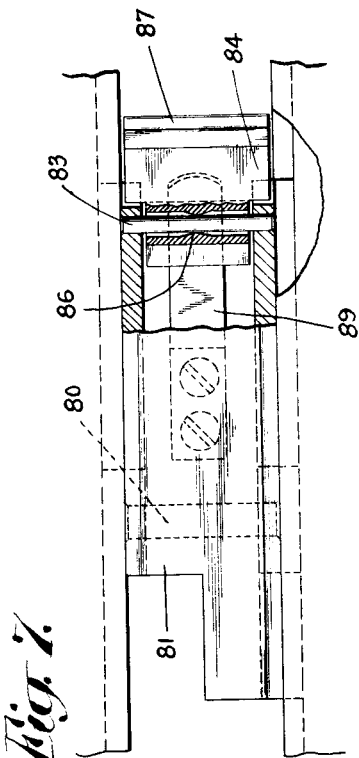
Inventor
E. A. Ford
By Attorneys
Cooper Kerr & Dunham Sept. 18, 1928.
E. A. FORD
1,684,389
CARD FEEDING AND HANDLING DEVICE
Filed June 1, 1925
8 Sheets-Sheet 6
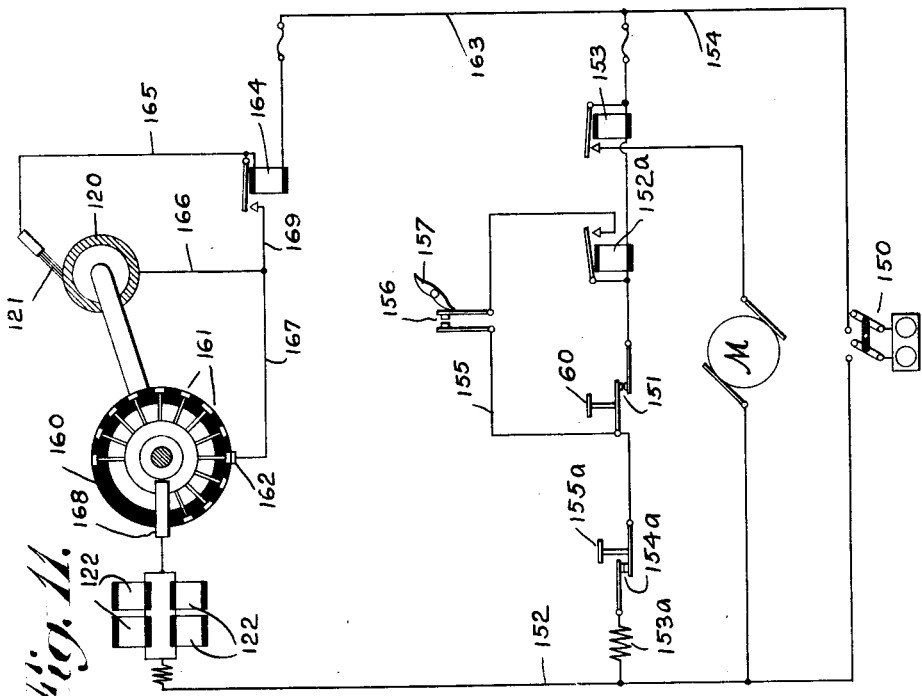
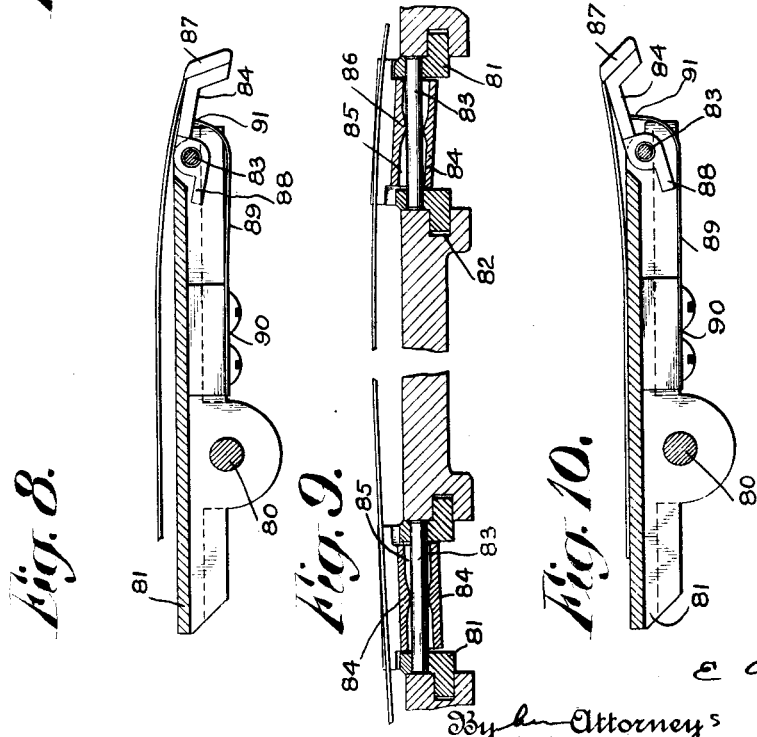
Inventor
E. A. Ford
By his Attorneys
Cooper, Kerr & Dunham Sept. 18, 1928.
E. A. FORD
1,684,389
CARD FEEDING AND HANDLING DEVICE
Filed June 1, 1925    8 Sheets-Sheet 7
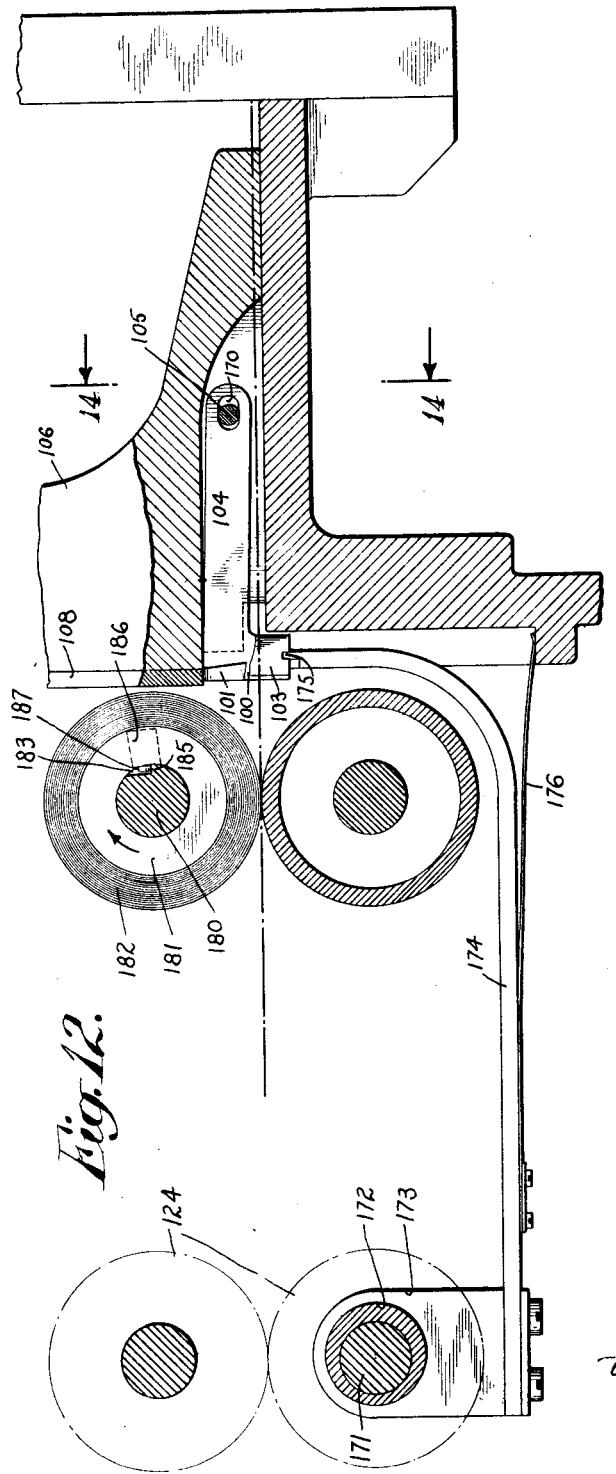
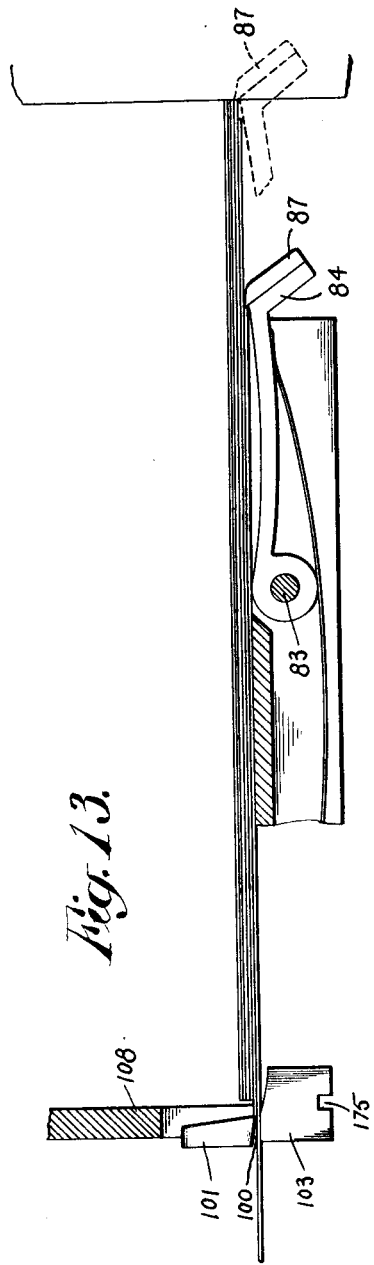
Inventor
E. A. Ford
By his Attorneys
Cooper, Kerr & Dunham Sept. 18, 1928.

E. A. FORD 1,684,389

CARD FEEDING AND HANDLING DEVICE

Filed June 1, 1925

Inventor
E. A. Ford
By his Attorneys
Cooper Kerr & Dunham

Patented Sept. 18, 1928.

1,684,389

UNITED STATES PATENT OFFICE.

EUGENE A. FORD, OF SCARSDALE, NEW YORK, ASSIGNOR TO THE TABULATING MACHINE COMPANY, OF ENDICOTT, NEW YORK, A CORPORATION OF NEW JERSEY.

CARD FEEDING AND HANDLING DEVICE.

Application filed June 1, 1925. Serial No. 34,077.

This invention pertains to machines for handling perforated record cards such as are used in tabulating systems. In machines of this class it is customary to feed the cards one by one from a stack of cards in a magazine into the machine, and the principal object of my present invention is to provide improved devices for feeding the cards.

In a promiscuous stack of cards it frequently happens that some, or all, the cards are bent or warped out of shape, and the accurate feeding of such cards has heretofore offered many difficulties. In the first place, it has been a problem to design a picker mechanism which would grip a warped card properly and propel it positively. In the second place, even if the picker secured a proper grip on the card, the card was liable to not properly enter the narrow throat opening through which it must pass, and be thereupon crushed or torn.

This invention provides improved picker and throat devices, both the picker and the throat being flexible, and floating, but positive in operation and found in practice to be well adapted to successfully handle distorted cards.

A further object of the present invention resides in the provision of a floating throat construction with provisions for imparting a movement of reciprocation thereto, which movement causes the throat members to jog the pack of cards and rearwardly displace any cards which have been improperly advanced even to a very slight extent. In this way the picker action is improved inasmuch as the lowermost card is prevented from being left in a slightly forward position at the time of the engagement of the picker. When such action heretofore occurred the picker frequently picked the second card from the bottom of the stack instead of the first thus causing a mutilation of the card edges and other improper feeding action.

Although my invention may be used in connection with a wide variety of card machines, I have, for purposes of illustration, described it as an improvement in the sorting machine disclosed in my copending application, Serial No. 748,347.

I also provide an improved indexing device which enables the operator to easily set the sorter brush to traverse the desired column on the cards being sorted or analyzed.

Further and other advantages of the present invention will hereafter appear in the accompanying specifications and claims, and in the drawings, which show what I now consider to be a preferred embodiment of the invention.

In the drawings,

Fig. 4 is a plan, partly in section, on line 4—4 of Fig. 2.

Fig. 5 is a plan on line 5—5 of Fig. 2 showing the brush setting index device.

Fig. 6 is an enlarged detail of the floating throat device.

Fig. 7 is an enlarged plan showing details of the floating picker device.

Figs. 8, 9 and 10 are detail views showing how the floating pickers adapt themselves to various shapes of warped cards.

Fig. 11 is a circuit diagram of my machine.

Fig. 12 is a detail view of a modified form of the invention in which provision is made for reciprocating the throat for jogging the cards in the stack.

Fig. 13 illustrates the improper picking action which the modification illustrated in Fig. 12 is adapted to correct.

Figure 1:
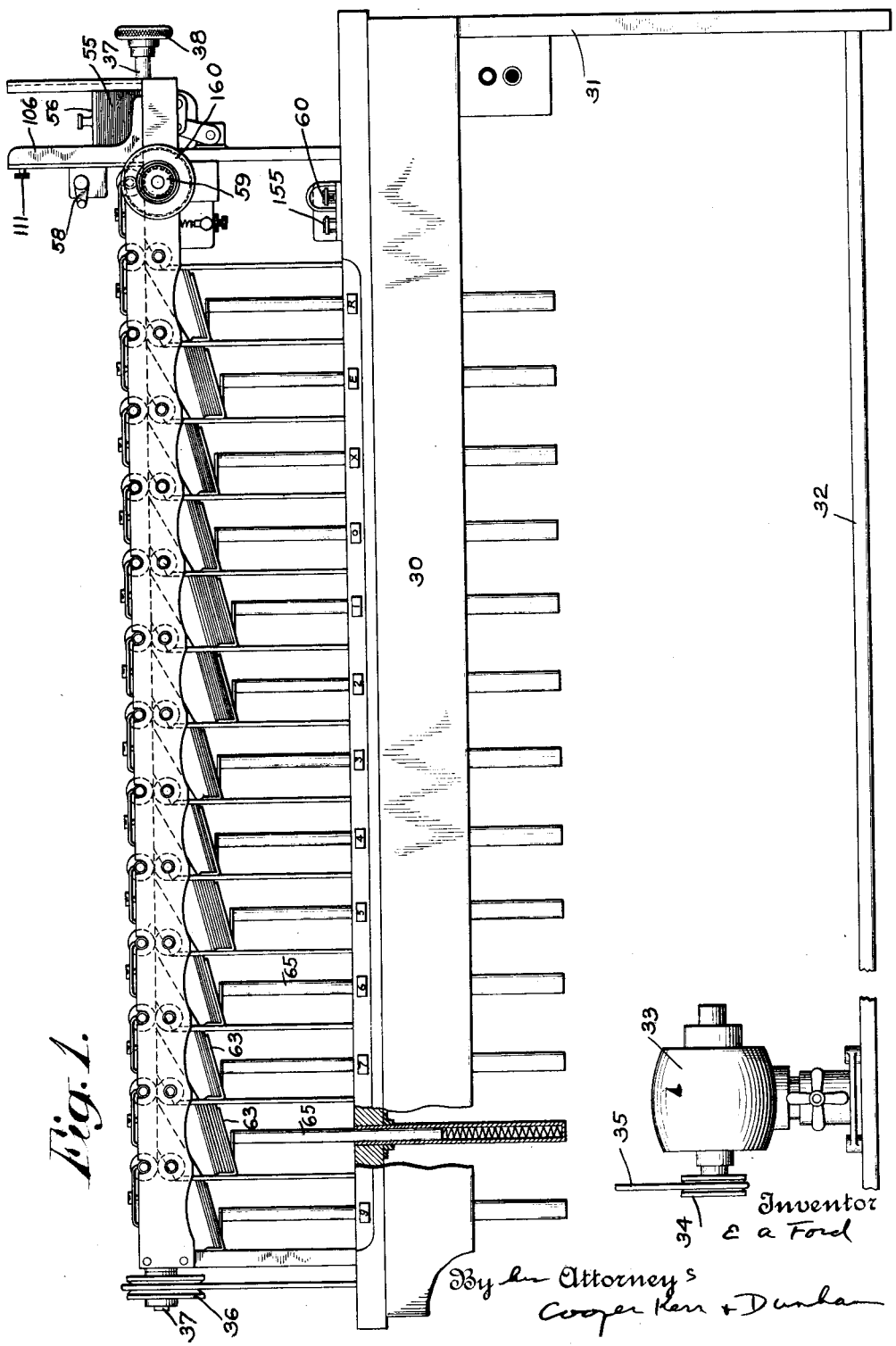
Fig. 1 is a front view of my sorter.

Referring to Fig. 1, 30 is the main frame of the machine, supported by legs 31 which carry a sub-frame 32 on which is mounted a motor 33 having a pulley 34 driving belt 35 which turns pulley 36, fast on shaft 37, which is the main drive shaft and extends the full length of the machine, in the rear, pulley 36 being on one end of it and hand wheel 38 on the other.

In using my machine the stack of cards to be sorted is placed in the feed magazine, as at 55, with plate 56 on top of the stack. This plate is used so that when there are only a few cards left in the stack there will be enough weight on them to prevent them from being displaced from their true position by the action of the picker. The operator by means of hand crank 58 sets the contact brush to a position so it will traverse the desired column on the cards as they pass under it, and he arranges the selector buttons 59 to give the kind of sort he wants. Then he starts the machine in operation by depressing button 60, whereupon the picker mechanism, which will be fully described latter, reciprocates, and feeds the cards one by one from the bottom of the stack into the analyzer, whence they are conducted by the conveyor rolls into the thirteen receiving stations R, E, X, 0, 1, 2, 3, 4, 5, 6, 7, 8, and 9. Each receiving station has an inclined tray 63 carried on a vertical stem 65 supported on a coil spring as shown in Fig. 1.

Worm 70 on shaft 37 (Figs. 2, 3, and 4) drives gear 71, fast on shaft 72, which has fast on its other end a disc 73 with a crank pin 74. This crank pin is connected by link 75 to one of a pair of arms 76 fast on shaft 77 supported by bearings 78 which are secured to the frame of the machine. The upper end of each arm 6 has a jaw portion 79 which engages a transverse pin 80 in a crosshead 81 slidably mounted in grooves 82 in the frame of the machine. At the rear end of each crosshead is a transverse pin 83, as is best seen in Figs. 8, 9, and 10. Mounted on each of these pins is a picker member 84. The hole 85 bored through the picker is considerably larger than pin 83 except a narrow central portion or collar 86, which is a close fit on pin 83. As a result of this construction, pickers 84 are held from moving bodily either horizontally or vertically, (except sidewise within the confines of the crosshead) but are free to rock or "float" to a limited extent, either horizontally or vertically or in any direction, restricted only by the sides of the crosshead in which they fit loosely, and by the pins 83.

On the rear end of each picker is a blade 87 designed to engage the edge of a card. The other end of each picker has a tail 88 which limits the up-and-down rocking of the picker. Each picker is pressed gently upwards by a spring 89 fast to the crosshead at 90 and pressing against the under side of the picker at 91.

Figure 2:
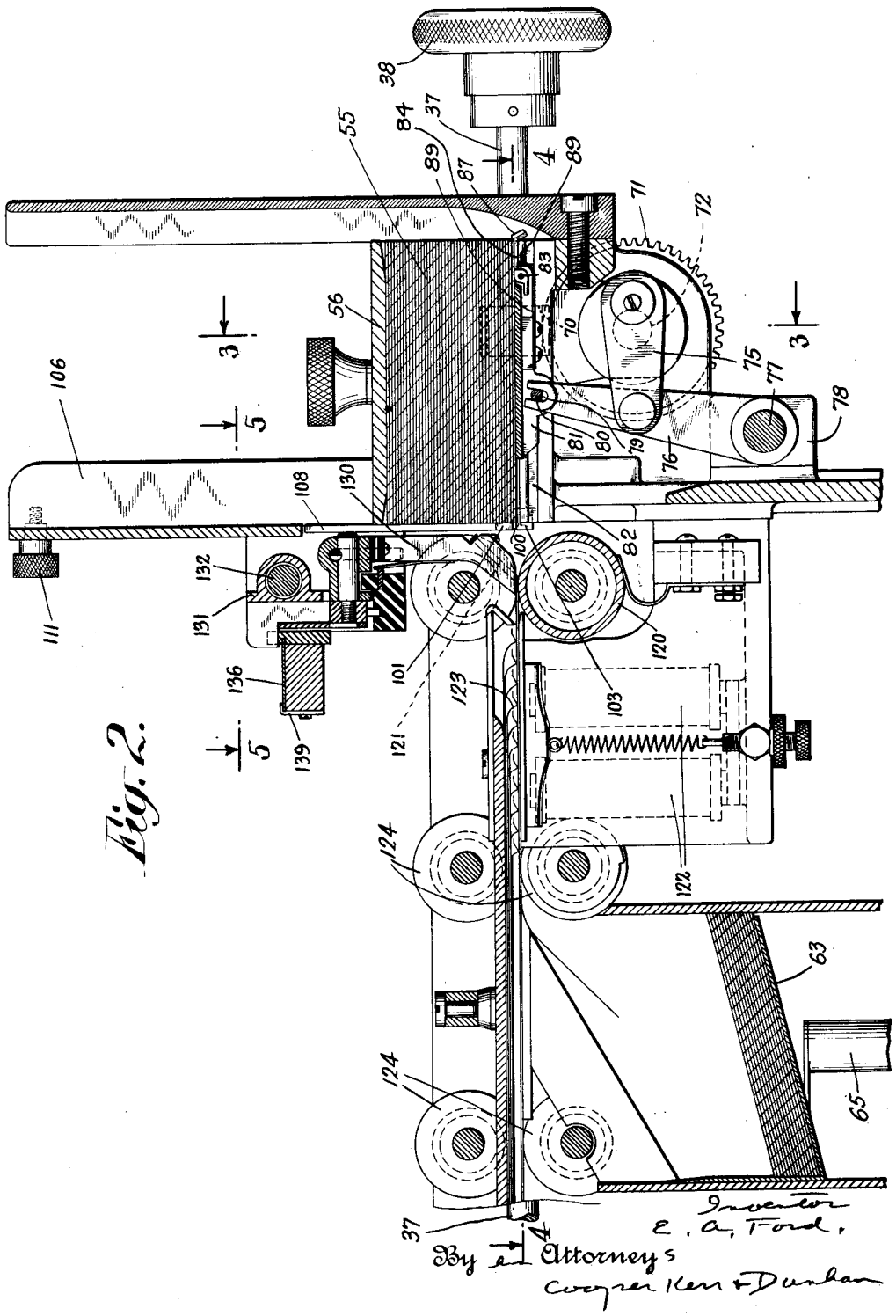
Fig. 2 is a sectional side elevation through the card magazine and analyzing device.

It is evident from the above that as shaft 72 rotates, arms 76 will be rocked back and forth, causing crossheads 81 to be reciprocated in their guides, thereby causing picker blades 87 to feed a card at each stroke. Normal conditions are shown in Fig. 2, in which the cards are shown flat, and in which the special advantages of my improved feeding mechanism are not brought fully into play. Figs. 8, 9, and 10, however, illustrate how my present device adapts itself automatically to properly feed warped cards, Fig. 8 showing the positions assumed by pickers 84 when the card is concave downwards, Fig. 10 when it is concave upwards, and Fig. 9 when it is bowed from side to side. These drawings illustrate the extreme flexibility of my feeling mechanism and show how it will adapt itself automatically to any card.

Figure 3:
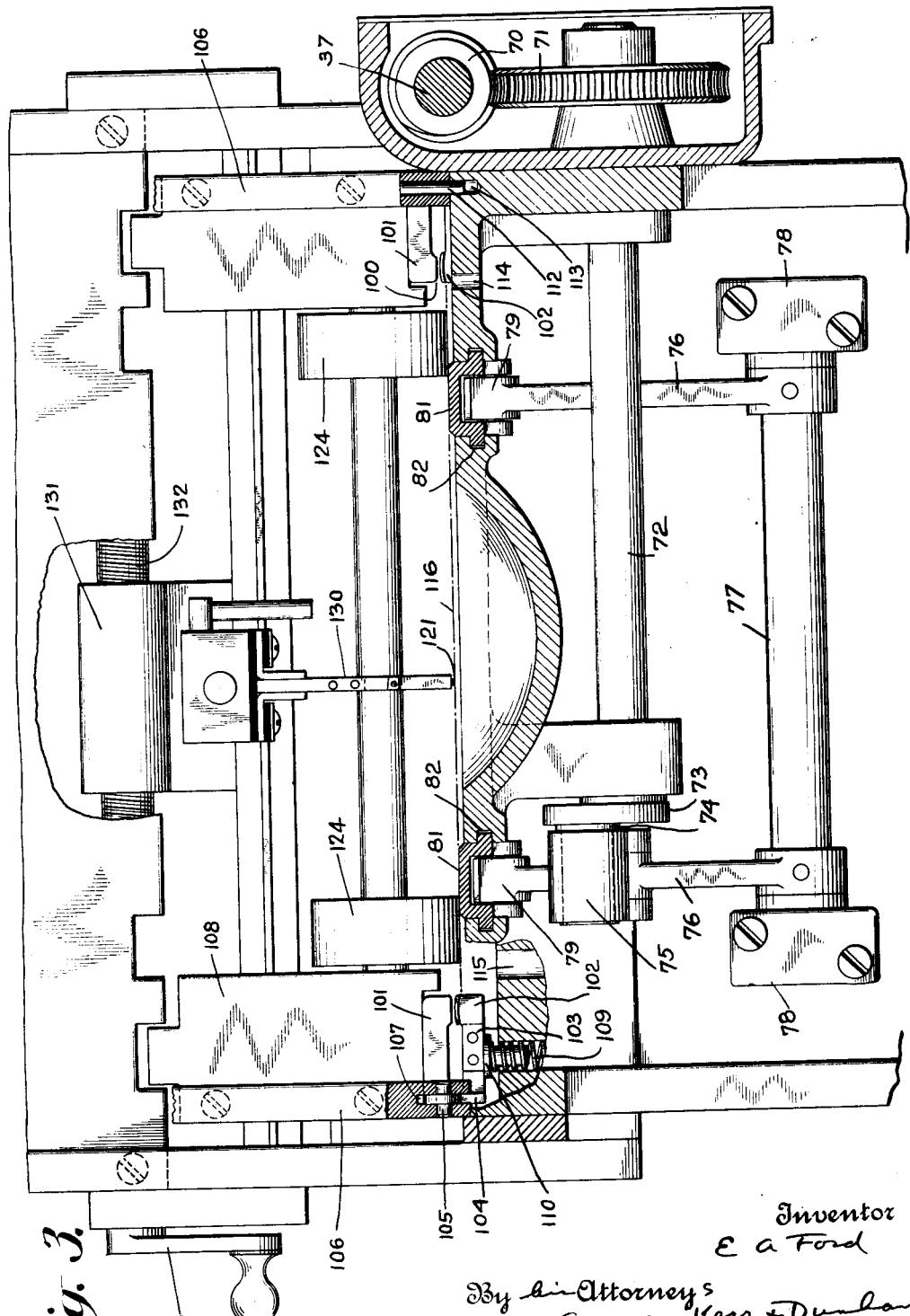
Fig. 3 is an end view, partly in section, on line 3—3 of Fig. 2.

As each card is fed from the bottom of the stack by the picker it must pass through a throat opening wide enough to permit the passage of one card but narrow enough to prevent the passage of more than one. For instance if the card is .007 inch thick the throat will be about .010 in. wide, thus permitting the easy passage of one card but preventing the passage of two. Heretofore it has been customary to build the throat into the machine in a fixed position and as a consequence the use of bent or warped cards has presented the same problems at the throat as I have described above in connection with the pickers. To meet this condition I provide two floating throats 100, one near each end of the card as it is fed from the magazine. The design of the throat may be readily understood from Figs. 6 and 3. The throat opening 100 is formed by an upper plate 101 shaped substantially as shown in Fig. 3 with an upper edge next the passing card, and a lower plate, or shoe, 102 shaped substantially as shown in Fig. 6, with its upper surface concave to the card and sloping slightly downwards as it recedes from the opening. This shoe is fast to plate 103, and both plates 101 and 103 are integral with, or fast to, plate 104 which is bent at a right angle to 101 and 103.

This arm 104 is pivoted on pin 105 which passes through the foot of pillar 106, in which a slot 107 is cut to accommodate arm 104, which is free to swing within the slot on pin 105. If there are no cards in the magazine the throat device is held with plate 101 against stop plate 108 by the coil spring 109 acting against the under side of plate 103 through flanged button 110.

Pillars 106 serve as end walls of the card magazine, being held at their tops by thumb screws 111, and at their feet by dowel pins 112 fitted into holes drilled into the frame as at 113. If shorter cards are used, pillars 106 can be moved to proper positions with their dowel pins in new holes such as 114, so that the cards may be snugly held endwise while in the magazine. When the pillars, or end walls, 106 are moved, the floating throats, being pivoted to members 106, are moved also, and it is necessary to move coil spring 109 and button 110 to a hole as at 115 corresponding to the new position. Plates 108 are fast to pillars 106 and serve the double purpose of forming a portion of the back wall of the card magazine, and forming a stop to limit the upward motion of the throat. In its highest position, plate 102 of the throat is slightly above the plane of the bottom card in the magazine, as shown in Fig. 6, the line 116 indicating the card plane. When a stack of cards is placed in the magazine the rear edge of the stack rests on top of shoe 102, and if the bottom cards of the stack are flat shoe 102 is depressed against spring 109 until the throat 100 is on the card plane 116, and there it remains as long as flat cards are being fed through it. If, however, any card is warped so that its rear edge does not lie flat on the bottom of the card magazine, the shoe 102, being urged upwardly by its spring 109, will remain in contact with the bottom of the card, and the throat itself 100 will always be properly positioned to permit passage of the bottom card when the card is pushed forward by the picker.

After passing the throat the card passes over contact cylinder 120, under analyzing brush 121, whereupon the control magnets 122 are energized and the distributing ribbons 123 actuated at the proper time so that the card is conducted by the conveyor rollers 124 to the receiving station corresponding to the perforation found in the card by brush 121, all as fully described in my co-pending application above referred to.

Contact brush 121 is mounted in brush holder 130, which, in turn, is carried by member 131 through which passes screw 132 extending crosswise of the machine and operable by hand crank 58 to position brush 121 so it will traverse the desired column on the card. To assist in readily setting the brush to the desired column, the brush holder structure 131 is provided (Fig. 5) with a pointer 133 cooperating with an index plate 134 which is graduated as at 135 to correspond to the column numbers printed on the cards being sorted. However, some tabulating cards have no column numbers printed on them, which renders the above indexing scheme of little value. For such cards I provide a supplementary device which permits easy and correct setting of the analyzing brush to the proper column. The operator cuts a strip from a blank card similar to those being sorted. Such a strip is shown at 136. It includes the card headings, as at 137, and the top row of index positions, as at 138. This strip is laid on index plate 134 with its inner edge in groove 139 and its outer edge held by clip 140, which in turn is held in position by thumb screws 141. The operator places strip 136 with its first index position 138 above the numeral 1 on index 135, and can then go ahead with full assurance that if pointer 133 indicates a certain column on strip 136 the brush will analyze that column on the cards passing under it. Thus in Fig. 5 the brush will traverse the first column in the "Account" section of the cards.

The operation of the electric circuits in my machine will be understood from the diagram in Fig. 11. Current is supplied to the line whenever switch 150 is closed. Then when the operator depresses start key 60 contact 151 is closed and current flows from left side of line 152 through resistance 153a, contact 154a controlled by stop key 155a, contact 151, magnet 152a, magnet 153, to line 154 and back to source. When magnet 153 is energized it closes its relay and establishes a holding circuit through motor M, and the motor runs as long as magnet 153 is energized.

When magnet 152 is energized it closes its relay and provides a stick circuit through line 155 and contact 156. Contact 156 is held closed by card lever 157 (Figs. 4 and 11) as long as cards are being fed through the machine. As soon as contact 156 is closed by a passing card, start key 60 may be released. The circuit is broken and the machine stopped if contact 156 is opened due to absence of cards, or if stop key 155a is depressed by the operator, thus deenergizing magnets 152a and 153.

The rotation of selector 160 (Figs. 1 and 11) is so timed with relation to the movement of the cards being fed into the sorter that each selector button 161 makes contact with a brush 162 just before the corresponding index position on the card reaches brush 121. Then if the brush finds a hole in the card at that position, it makes contact with cylinder 120, and current flows through line 163, magnet 164, line 165, brush 121, cylinder 120, line 166, line 167, brush 162, button 161, brush 168, magnet 122, to other side of line.

The energization of magnet 122 actuates the distributing devices so that the card is taken to its proper station, as is fully described in my other application already referred to.

Energization of magnet 164 closes its relay and provides a shunt path for the control current through line 169 to the selector, thereby taking most of the current from the contact brush, and preventing arcing at the brush when the brush leaves the hole in the card.

In order to feed cards from a magazine positively it is essential that the stack of cards be not packed tightly in the magazine. This freedom allows the stack, especially the bottom cards which are influenced by friction of the card being fed to move back and forth slightly with the picker.

This is especially true of those bottom cards which are below stop plate 108, so that sometimes the condition arises, as shown exaggerated in Fig. 13 in which the bottom card in passing through throat 100 has drawn with it the second card from the bottom until the second card is against throat plate 101.

If the second card remains in this position, until the picker tries to feed it, the picker may, as shown in dotted position in Fig. 13 reach beyond the card which is in advanced position and engage the card next above it. To overcome all possibility of such an occurrence I provide the improved devices shown in Fig. 12, in which pin 105 engages a slotted opening 170 in plate 104, thus allowing plate 104 and the other throat forming parts to move slightly back and forth horizontally. On shaft 171 which carries the first lower pair of rollers 124, I provide an eccentric 172, engaging a block 173 on the bottom of which is fastened one end of horizontal plate 174 curved so that its other end projects vertically and enters a slot 175 in the bottom of throat block 103. Plate 174 is held in engagement with block 103 by flat spring 176. One end of the spring is fast to plate 174 and the other end rests on the frame of the machine. This spring also holds shoe 103 against the bottom of the cards in place of coil spring 109 previously described.

Shaft 171 being positively driven and making one revolution for each card cycle, it is evident that eccentric 172 will move plate 174, and with it throat block 103, back and forth once each card cycle. The timing of this cycle is such that the picker having carried the bottom card forward through the throat said card has been gripped between rim 182 and the rim of its coacting roller so that the bottom card continues to move forward as the picker moves back, and the throat member moves back at the same time pushing back the next card to be fed into its proper alignment while the bottom card is still moving forward through the throat so that by the time the picker has reached the end of its travel the next card is in the proper position to be fed.

Figure 14:
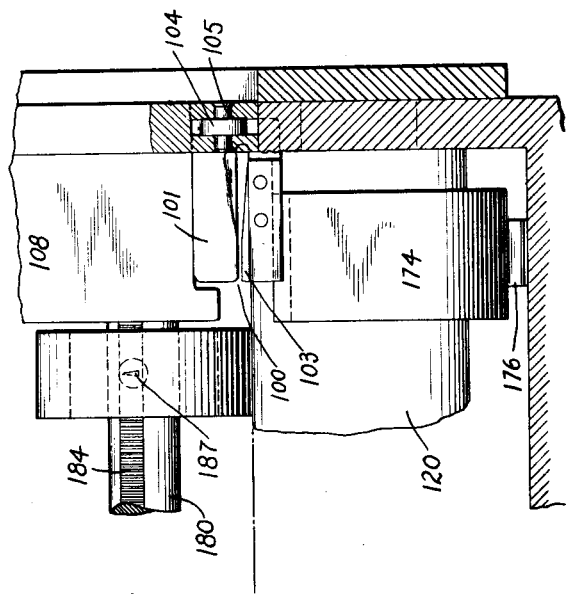
Fig. 14 is a detail sectional view taken on line 14—14 of Fig. 12.

As already described, my machine may be used for feeding either long or short cards, and when a change in card length is made it is desirable to adjust the first pair of upper feed rolls on their shaft to correspond to the new card. I provide for this adjustment as shown in Figs. 12 and 14 in which shaft 180, turning in the direction indicated by the arrow, drives in the same direction the rollers 181, which I make with a center or hub of metal, and an outer rim 182 of bakelite. Shaft 180 has cut in it a longitudinal groove 183 forming a flat surface 184 which is knurled as indicated in Fig. 14, and also forming a shoulder 185. Inserted tightly in the hub of the roller is a plug 186 which has a narrow extension 187 projecting into groove 183. Rim 182 keeps plug 186 in place in the hub of the roller. As illustrated in Fig. 12, the roller has been turned forwardly (in the direction of rotation) by the operator. In this position extension 187 is out of contact with corrugations 184 and the roller may be freely moved to its new position on the shaft. As soon as the shaft 180 begins to rotate, however, the shaft turns clockwise relatively to the roller and the shape of groove 183 causes projection 187 to wedge into one of the corrugations 184, in which position roller 181 revolves with the shaft and is prevented from moving lengthwise on the shaft until the operator again advances the roller to its shiftable position against shoulder 185.

Figure 15:
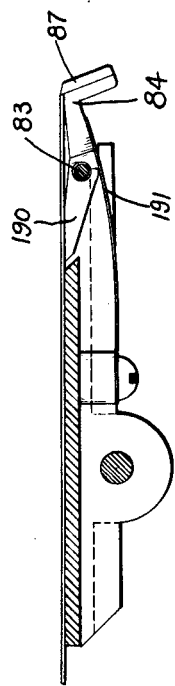
Fig. 15 is a modified form of picker.

In Fig. 15 I show an improved type of picker blade in which the blade 84, pivoted on pin 83 has a forwardly projecting extension 190 on which rests a portion of the weight of the cards in the magazine. Under some conditions this is taken advantage of to enable a lighter spring to be used under the picker blade than would otherwise be required, because the load on extension 190 helps the spring 191 to raise the other end of the picker, thus relieving the spring of part of its work.

I claim

1. In a machine of the character described, in combination, a card magazine, a floating card throat, and automatic means to maintain said throat in alignment with the edge of the card about to be fed.

2. In combination, a card magazine and a member having a card throat formed therein, said member being pivotally mounted on said magazine.

3. In combination, a card magazine, a card throat, said throat being formed by upper and lower members, and means to maintain said throat in alignment with the edge of the card about to be fed from said magazine.

4. In a machine of the character described, in combination, a card magazine, a throat carrying member pivoted on the wall of said magazine, and resilient means for pressing said member against the next card to be fed from said magazine.

5. In combination, a card magazine having end walls settable for different lengths of cards, throat forming members pivoted on said end walls, and means for automatically maintaining said throats in alignment with the edge of the card about to be fed from the magazine.

6. In an apparatus for feeding warped cards, in combination, a card magazine, a picker, a mounting for the same to permit it to adjust itself to the surface of a warped card, and means to automatically maintain the surface of said picker in contact with the card being fed from said magazine.

7. In an apparatus for feeding warped cards, in combination, a magazine, a reciprocating cross-head with a picker member mounted thereon, a mounting for the same to permit it to adjust itself to the surface of a warped card and automatic means to maintain the surface of the picker member in contact with the warped card being fed.

8. In an apparatus for feeding warped cards, in combination, a magazine, a reciprocating cross-head, a pin through said cross-head, a picker member mounted on said pin and free to rock thereon and adjust itself to the surface of a warped card, and resilient means to maintain the surface of said picker member in contact with the card being fed.

9. In an apparatus for feeding warped cards, in combination, a magazine, a picker member having a picker blade, and automatic means to insure full-length contact of said blade on the edge of the card being fed from said magazine.

10. In an apparatus for feeding warped cards, in combination, a magazine, a card throat, and a card picker, said throat having automatic means to maintain it in alignment with the card about to be fed, and said picker having automatic means to adjust the position of the picker to the contacting surface of the card being fed.

11. In a card handling apparatus including in combination, a card magazine, and a member having a throat formed therein reciprocably mounted with reference to said magazine.

12. In a machine of the character described, in combination, a card magazine from which cards are withdrawn one at a time, a reciprocably mounted member having a throat formed therein and means to reciprocate said member once for each card withdrawn from the magazine.

13. In a card feeding apparatus, in combination, a card magazine, a reciprocating picker, a reciprocating member having a throat formed therein, and means to reciprocate said picker and said throat member in fixed relationship with each other.

14. In a card feeding apparatus, in combination, a card magazine, a vibratory member having a throat formed therein, and means for vibrating said throat member.

15. In a card feeding apparatus, in combination, a shaft, a card engaging roll mounted thereon, means to permit the endwise adjustment of the roll relative to said shaft, said means having provisions to automatically lock said roll to said shaft when said shaft rotates in one direction, said means having provisions for releasing the said roll from said shaft upon angular displacement of said roll in the direction of rotation of the shaft.

16. In a card handling apparatus having a card magazine from which cards are to be removed one at a time, means for controlling the exit of the cards therefrom and for preventing more than one card to leave the magazine at a time, said means comprising a vibrating floating throat and imparting a back movement thereto in timed relation to the withdrawal of the cards from the magazine.

17. The invention set forth in claim 16 in which the floating throat comprises a pair of members one disposed adjacent each end of the card.

18. The invention set forth in claim 16 in which the floating throat comprises a throat member and a support therefor, and in which means is provided for supporting said member upon the frame of the machine, said means having provisions permitting pivotal and longitudinal displacement of said member.

19. The invention set forth in claim 16 in which a combined member is provided for reciprocating the throat and supporting the same, and in which resilient means are provided arranged to press upon said member to yieldingly support the throat for automatic vertical displacement thereof.

20. In an apparatus for feeding warped cards, in combination, a card magazine, a picker, a mounting for said picker whereby the picker may rock about or on said mounting to permit it to adjust itself to the surface of a warped card, and means to automatically maintain the surface of said picker in contact with the card being fed.

21. In an apparatus for feeding warped cards in combination, a magazine, a pin, a picker having a constricted bore in engagement with said pin to permit the picker to adjust itself to the surface of a warped card, and means to automatically maintain the surface of said picker in contact with the card being fed.

In testimony whereof I hereto affix my signature.

EUGENE A. FORD.